W. G. STIMMEL & J. B. THOMPSON.
CHURNING PIT FOR IRRIGATION CANALS, DITCHES, AND OTHER WATERCOURSES.
APPLICATION FILED JAN. 3, 1916.
1,206,938.
Patented Dec. 5, 1916.
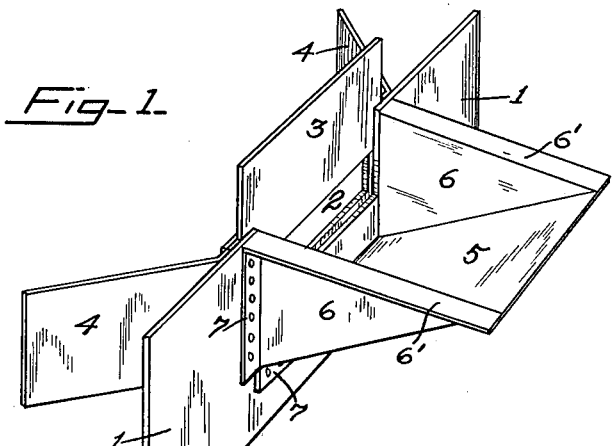
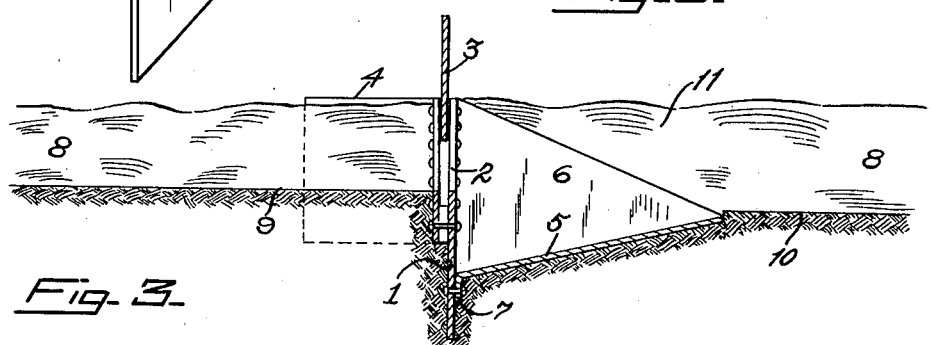
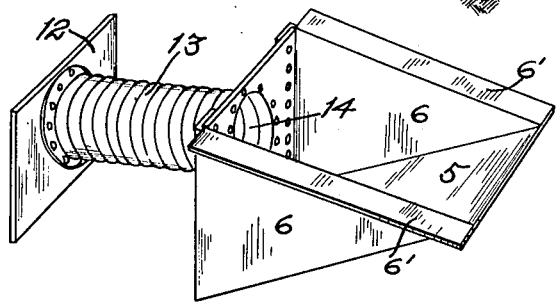
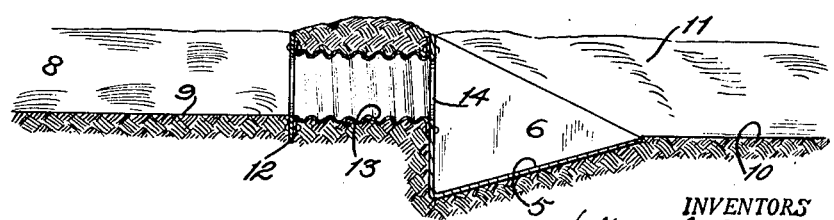
WITNESS
INVENTORS
William G. Stimmel
BY James B. Thompson
Wm. F. Booth
ATTORNEY

UNITED STATES PATENT OFFICE.

WILLIAM G. STIMMEL, OF SAN FRANCISCO, AND JAMES B. THOMPSON, OF VINA, CALIFORNIA.

CHURNING-PIT FOR IRRIGATION CANALS, DITCHES, AND OTHER WATERCOURSES.

1,206,938. Specification of Letters Patent. Patented Dec. 5, 1916.

Application filed January 3, 1916. Serial No. 69,758.

*To all whom it may concern:*

Be it known that we, WILLIAM G. STIMMEL and JAMES B. THOMPSON, citizens of the United States, residing, the said STIMMEL in the city and county of San Francisco and State of California, and the said THOMPSON at Vina, county of Tehama, State of California, have invented certain new and useful Improvements in Churning-Pits for Irrigation Canals, Ditches, and other Watercourses, of which the following is a specification.

Our invention relates to the art of carrying, controlling and distributing water in canals, ditches or other courses, for any purpose, whether in drainage or irrigation systems or other works. It is more particularly applicable to irrigation and for the sake of illustration, we shall hereinafter describe our improvement in connection with irrigation canals or ditches, though we are not to be understood as confining ourselves thereto, for the invention is applicable to any water courses in which the conditions exist involving and presenting the problem which our improvement is intended to solve.

In the carrying, control and distribution of irrigation water, it is necessary and common to have certain structures in the canals or ditches, and in the fields, as well. At present these are mostly built of wood, only the larger ones being of concrete. Of these structures there are two general types, known from their functions as "drops" and "gates", though a single structure, in a given instance, when the conditions require, may combine in itself both functions, and be a "drop" and a "gate" at the same time.

The prime object of a drop is to lessen the velocity of the flow of water through a canal or ditch by stepping it down from one level to another, in this respect being somewhat similar in principle to a lock in a canal. A gate is for the purpose of letting water pass or not pass, as the case may be, through the canal or ditch wherein the gate is placed or into another canal or ditch or onto a plot of land, for irrigation. A gate becomes a drop when it not only passes or holds back water as the case may be, but when it also drops water to a lower level whether in the canal or ditch wherein the structure is placed or into another canal or ditch or upon a plot of land. Inasmuch as, in one sense, these structures, whether drop or gate or a combined drop and gate, control the flow of water, whether in velocity or direction or level, we shall herein, for convenience of expression, and in order to concisely describe the association and combination therewith of that part of our completed construction which specially relates to and concerns the churning pit proper, refer to them as a "controlling structure", being understood to mean by the use of this expression, any form of drop or gate or a combination of both which it may be found expedient or desirable to adopt. The problem presented by these controlling structures is, how to prevent the water from washing holes in the canal or ditch and in the banks thereof and doing damage, not only to the canals or ditches and to their banks, but to the fields as well. Just below (that is, on the down stream side) of drops and gates there is nearly always an injurious and damaging wash in both banks and in the bottom of the canal or ditch, and although in some instance a churning pit with side walls has been used in connection with the controlling structure, the bottom of this pit and the shape and disposition of its walls have been such that but little material benefit has followed such use.

It is the object, then, of our invention to prevent this wash, and this object we attain by a novel construction, disposition and shape of the bottom of the churning pit and its side walls, as we shall now fully describe by reference to the accompanying drawings, in which—

Figure 1 is a perspective view of our improvement, shown with one form of controlling structure, the whole being shown without relation to the canal or ditch. Fig. 2 is a longitudinal central section through the canal or ditch showing our improvement of Fig. 1 *in situ*. Fig. 3 is a perspective view of our improvement as applied to a controlling structure of a form different from that shown in Fig. 1, but involving the same principles. Fig. 4 is a longitudinal vertical section through a canal or ditch showing our improvement of Fig. 3, *in situ.*

Referring to Fig. 1, the numeral 1 indicates the body member of a controlling structure, having in its upper part a cut away portion or opening 2 with a slide 3 fitted in suitable border guides of the opening. This structure is here shown as further provided with guard wings or approaches 4 on its up-stream side, which wings may extend at any suitable angle in accordance with the conditions found necessary in any given instance to best provide against side wash. Secured to the down-stream side of the structure member 1, around its delivery opening 2, is a pit forming member which comprises a bottom 5 and side walls 6. The attachment of this pit member to the structure body member may be of any suitable nature, depending upon the material used in construction. This material may be wood, concrete or sheet metal. If these members be made of sheet metal, as in many instances they may be, a flange 7 on the pit member will serve to rivet it to the body member. The essential novelty in this pit member lies first in the feature of its bottom 5 sloping gradually upwardly from its junction with the structure member 1 on a line below the lower line of the opening 2 of said member, to its extremity, and, second, in the feature of its side walls 6 inclining or tapering downwardly at any angle or distance in accordance with conditions to be met in ditch or canal construction and character of soil.

In Fig. 2, to which attention is now directed, the location of the whole structure of Fig. 1 in the canal or ditch is seen. 8 is the canal or ditch. The body member 1 is set to traverse the canal or ditch and is firmly embedded in its banks. The approaches or wings 4 extend upstream and the banks are filled in outside or behind them. The delivery opening 2 of the structure member 1 has a capacity approximately equal to the carrying capacity of the canal or ditch, and the bottom line 9 of the canal or ditch above the controlling structure is on the level or approximately so with the bottom line of the opening 2. The up-stream ends of the bottom 5 of the pit member is below the level of the opening 2, and the down stream end or extremity of said bottom rises to and is substantially on the level of the bottom line or grade 10 of the continuing canal or ditch. The side walls 6 of the pit-member incline downwardly from the structure 1, and the banks 11 of the canal or ditch come up against the outer surfaces of said walls. These walls, as shown in Fig. 1, are best formed with outwardly extending top flanges 6', which are embedded in the banks. Where the inclined upper edges of the side walls 6 meet the banks, and where the extremity or free edge of the pit bottom 5 meets the canal or ditch bottom they will merge into said banks and canal or ditch bottom and substantially conform to their surfaces. There is thus no abrupt change in the direction or force of the water current, a churning pit being formed which will itself receive the force of the falling water and quiet it in its subsequent equal, uniform and gentle flow, due to the uniformly upwardly sloping bottom 5, and to the gradually tapering side walls 6, the edges of both bottom and walls substantially merging into the canal or ditch surface, and thus preventing wash and avoiding any interference with the flow.

The churning pit may be as far below the opening in the controlling structure body member as ditch or canal grade renders necessary, say, six inches or more, and thence slope gradually and uniformly upwardly to substantially the bottom grade or line of the canal or ditch, or to substantially the level of the field. Soil wash will thus be prevented.

The character of the controlling structure may vary in many ways and assume various forms. We illustrate this in Figs. 3 and 4, wherein a head-plate or body member 12 is placed across the canal or ditch. From this member a conduit 13, say of corrugated metal, extends, said conduit having a delivery opening 14. To this conduit, in communication with its delivery opening, the pit member, as heretofore described, is suitably fitted.

We claim:—

1. A churning-pit for canals, water ditches and the like, comprising a controlling structure having a delivery opening; and a pit-member fitted to said structure on its down-stream side and in communication with its delivery opening, said pit member having a bottom, which from its junction with the controlling structure below its delivery opening, gradually slopes upwardly to substantially the bottom grade of the canal or ditch or the surface of the field to which it delivers the water.

2. A churning-pit for canals, water ditches and the like, comprising a controlling structure having a delivery opening; and a pit-member fitted to said structure on its down-stream side and in communication with its delivery opening, said pit member having a bottom, which from its junction with the controlling structure below its delivery opening, gradually slopes upwardly to substantially the bottom grade of the canal or ditch or the surface of the field to which it delivers the water, and said pit-member having also side walls which gradually incline downwardly from their junction with the controlling structure, the inclined top edges of said walls fitting closely to and merging into the banks of the canal or ditch or the soil of the field.

In testimony whereof we have signed our names to this specification in the presence of subscribing witnesses.

WILLIAM G. STIMMEL.
JAMES B. THOMPSON.

Witnesses for Stimmel:
W<small>M</small>. F. B<small>OOTH</small>,
D. B. R<small>ICHARDS</small>.
Witnesses for Thompson:
E<small>VALYN</small> K. T<small>HOMPSON</small>,
L<small>INDSEY</small> H<small>UDSON</small>.